Feb. 18, 1958  A. H. BRODBECK  2,823,657
COOKING RANGE
Filed Jan. 16, 1956  2 Sheets-Sheet 1
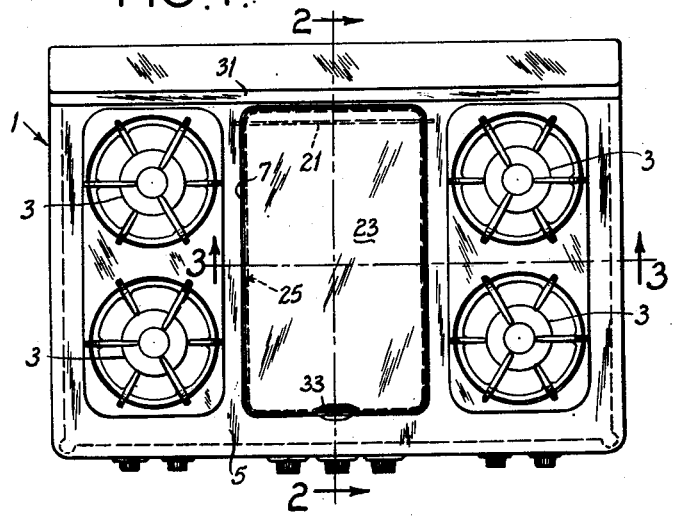
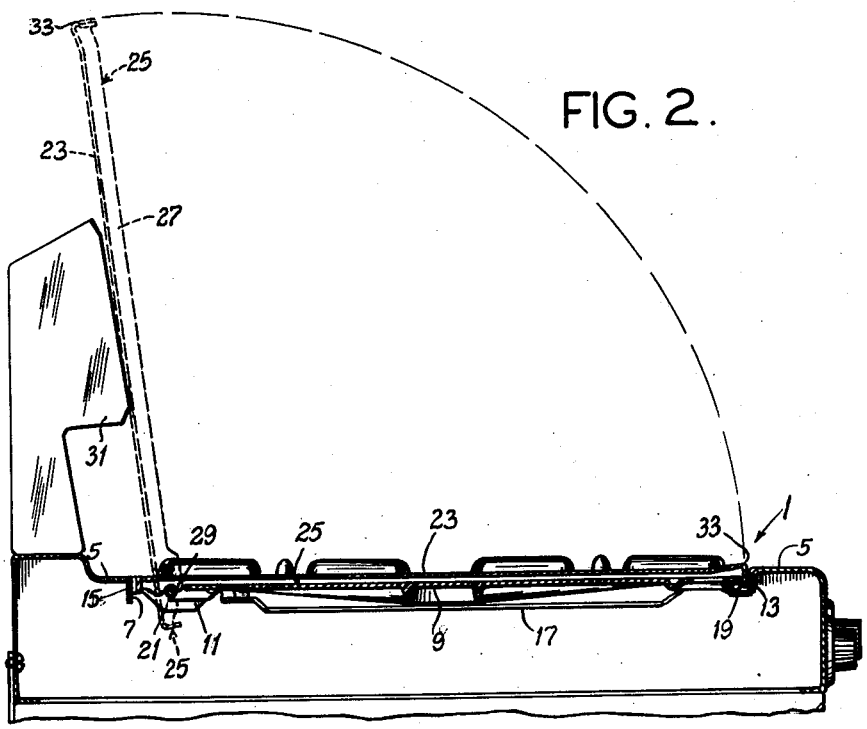
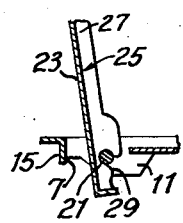

Feb. 18, 1958 A. H. BRODBECK 2,823,657
COOKING RANGE
Filed Jan. 16, 1956 2 Sheets-Sheet 2
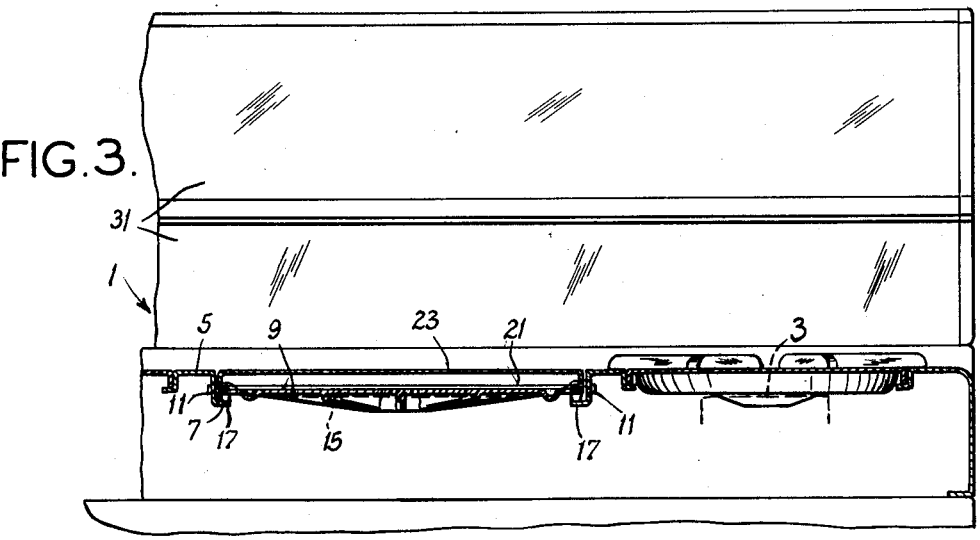
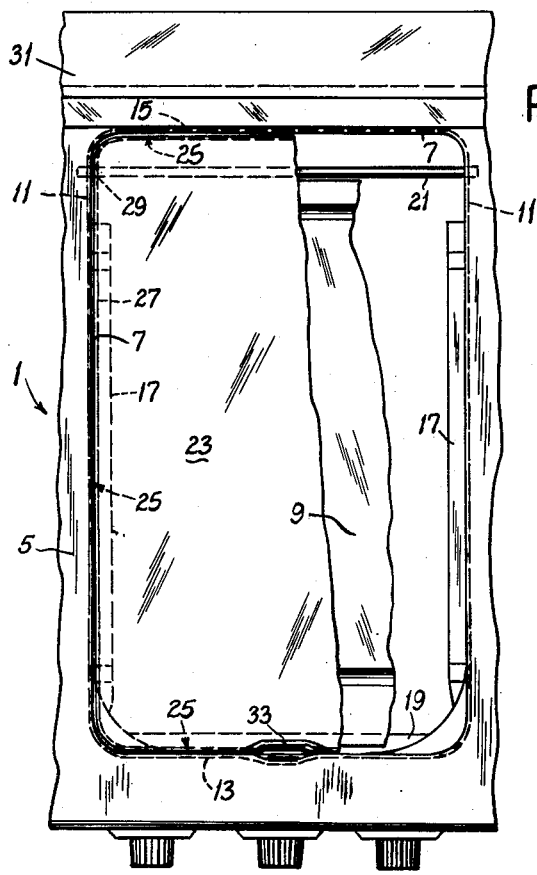
Almer H. Brodbeck,
Inventor.
Koenig and Pope,
Attorneys.

United States Patent Office 2,823,657
Patented Feb. 18, 1958

2,823,657
COOKING RANGE

Almer H. Brodbeck, St. Louis, Mo., assignor to Magic Chef-Food Giant Markets, Inc., a corporation of New Jersey Application January 16, 1956, Serial No. 559,173

1 Claim. (Cl. 126—37)

This invention relates to cooking ranges, and more particularly to a cooking range of the type having a griddle.

Among the several objects of the invention may be noted the provision in a range of the class described of a cover for the griddle which is adapted to be swung from a position overlying the griddle for keeping the griddle clean when not in use to an out-of-the-way position for use of the griddle, and which is also readily removable; and the provision of a griddle cover which when removed may be used as a tray or a pan. Other objects and features will be in part apparent and in part pointed out hereinafter.

The invention accordingly comprises the constructions hereinafter described, the scope of the invention being indicated in the following claim.

In the accompanying drawings, in which one of various possible embodiments of the invention is illustrated, Fig. 1 is a plan of a so-called divided-top range having a griddle and a griddle cover of this invention;

Fig. 2 is an enlarged vertical section taken on line 2—2 of Fig. 1, showing the griddle cover in lowered position in solid lines and in raised position in dotted lines;

Fig. 2A is a fragment of Fig. 2 showing the griddle cover in raised position in solid lines;

Fig. 3 is an enlarged vertical section taken on line 3—3 of Fig. 1; and,

Fig. 4 is an enlargement of the central portion of Fig. 1, with parts broken away.

Corresponding reference characters indicate corresponding parts throughout the several views of the drawings.

Referring to the drawings, there is indicated at 1 a divided-top cooking range. As shown, this has four burners 3, located in pairs toward opposite sides of the range. The range has a top wall designated 5. This has a central rectangular opening 7 between the pairs of burners. Located within this opening, somewhat below the top wall 5, is a griddle 9.

The top wall has downwardly extending vertical flanges 11 at opposite sides of the opening 7, and downwardly extending vertical flanges 13 and 15 at the front and rear of the opening 7. The side flanges 11 and the front flange 13 have inwardly directed horizontal ledge portions 17 and 19, respectively, at their lower edges for supporting the griddle.

The length of the griddle 9 from front to rear is less than the length of the opening 7 from front to rear and the griddle is supported in the opening with its rearward end spaced from the rearward end of the opening. It will be understood that under the griddle is a burner (not shown). A rod 21 extends across the opening 7 between the side flanges 11 at the rear of the griddle.

At 23 is indicated a griddle cover of this invention. This consists of a sheet metal plate having a continuous peripheral flange 25, the side portions of which are designated 27. These side flange portions have notches 29 located adjacent the rearward end of the cover receiving the rod 21. These notches are angled toward the rearward end of the cover from their inner to their outer ends.

The cover is adapted to fit within the opening 7 and is swingable on the rod between the lowered horizontal position illustrated in solid lines in Fig. 1 overlying the griddle, and the raised out-of-the-way position illustrated in dotted lines in Fig. 2 and in solid lines in Fig. 2A leaning back against a back-guard 31 which extends upward at the rear of the top wall of the range. The cover is formed at its forward end with a tab portion 33 whereby it may be raised with the fingertips. In the lowered position of the cover, the peripheral flange 25 of the cover surrounds the griddle, the side portions 27 of the flange 25 engaging the side ledges 17, and the front portion of the flange engaging the front ledge 19. In the raised position of the cover, the notches 29 are angled downward from their inner to their outer ends so that the cover cannot slip downward off the rod.

The cover 23 may be removed simply by swinging it up and away from its lowered position, and then moving its lower end upward and rearward to disengage it from the rod 21. Then it may be used as a tray or a pan, if so desired.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

A cooking range having a top wall, said top wall having an opening, a griddle in said opening, said top wall having downwardly extending flanges at opposite sides of said opening, the rear end of the griddle being spaced from the rear end of the opening, a griddle cover comprising a sheet metal plate having a peripheral flange, side portions of said peripheral flange having notches adjacent the rearward end of the cover, and means supported by said downwardly extending flanges in the opening at the rear of the griddle received in the notches for supporting the cover for swinging movement away from a lowered position overlying the griddle with the peripheral flange surrounding the griddle, said cover being removable from said means.

References Cited in the file of this patent

UNITED STATES PATENTS

| 1,854,035 | Hurt | Apr. 12, 1932 |
| 1,954,174 | Hoffstetter et al. | Apr. 10, 1934 |
| 1,954,580 | Toomey | Apr. 10, 1934 |
| 1,963,721 | Smith | June 19, 1934 |
| 2,002,894 | Kahn | May 28, 1935 |
| 2,011,125 | Small | Aug. 13, 1935 |
| 2,483,562 | Reeves | Oct. 4, 1949 |
| 2,571,292 | Reeves | Oct. 16, 1951 |
| 2,605,926 | Casey | Aug. 5, 1952 |